United States Patent [19]

Volz et al.

[11] 4,063,990
[45] Dec. 20, 1977

[54] DEVICE FOR THE WELDING OF AN INJECTION-MOLDED SPIGOT IN A THIN-WALL FLUID VESSEL

[75] Inventors: Dieter Volz, Morsch; Kurt Buchscheidt, Ettlingen, Baden; Reiner Rech, Reichenbach, all of Germany

[73] Assignee: Elbatainer GmbH, Ettlingen, Baden, Germany

[21] Appl. No.: 725,480

[22] Filed: Sept. 22, 1976

[30] Foreign Application Priority Data

Sept. 26, 1975 Germany .......................... 2542969

[51] Int. Cl.² .................. B23K 19/04; B29C 27/08
[52] U.S. Cl. ............................... 156/580.2; 228/1 R
[58] Field of Search ............... 156/580.1, 580.2, 73.1, 156/73.4, 580, 583; 264/69; 228/1 R

[56] References Cited

U.S. PATENT DOCUMENTS

| 3,608,809 | 9/1971 | Cushman | 156/73.1 X |
| 3,612,385 | 10/1971 | Humpage | 156/73.1 X |
| 3,654,041 | 4/1972 | Wysong | 156/73.1 X |
| 3,947,307 | 3/1976 | Buchscheidt | 156/580.2 X |

*Primary Examiner*—Charles E. Van Horn
*Assistant Examiner*—M. G. Wityshyn
*Attorney, Agent, or Firm*—Montague & Ross

[57] ABSTRACT

A device for the ultrasonic welding of a tubular fitting having an annular flange in an opening of a thin-wall synthetic-resin foil container has an anvil supporting the fitting against the ultrasonic welding head. The anvil includes an upper anvil member and a lower anvil member. The upper anvil member has an upper surface confronting the head and formed in axial alignment with the head with a protuberance holding the foil away from this surface. The surface is provided with an annular groove receiving a first rubber ring registering with the head and supporting the flange of the fitting, the first rubber ring having an elasticity greater than that of the foil of said container. The lower member has a surface juxtaposed with said upper member and provided with an annular recess receiving a second rubber ring. The second rubber ring projects above the surface of said lower member.

5 Claims, 4 Drawing Figures

DEVICE FOR THE WELDING OF AN INJECTION-MOLDED SPIGOT IN A THIN-WALL FLUID VESSEL

FIELD OF THE INVENTION

The present invention relates to a device for the fluid-tight sealing by welding with ultrasonics of a closable injection-molded spigot or fitting into an opening of a thin-wall, flexible thermoplastic synthetic-resin-foil container.

BACKGROUND OF THE INVENTION

So-called two-part containers, such as carboys, have in recent years been constituted by an inner container or lining of synthetic-resin thermoplastic foil, or a so-called soft thermoplast, such as high pressure polyethylene, and an outer supporting structure or cardboard or other material.

It is common practice to form the inlet and outlet fitting or spigot of the inner container by injection molding as a tubular, relatively hard synthetic-resin body having a foot underlying the foil surrounding an opening formed in the inner container. The fitting may be provided with formations adapted to receive a threaded cap by which the carboy is closed in a fluid-tight manner.

A relatively thick-walled injection molded fitting is fitted through the opening and can be welded around to the thin-walled material of the inner container. The welding should be fluid-tight and sufficiently strong to prevent damage during transport and handling of the receptacle.

It is known to weld the foil of the thin-wall container, consisting of a plastified synthetic resin and produced by blow-molding or vacuum-forming, to the preformed injection-molded thick-walled fitting by the use of ultrasonic welding techniques (see U.S. Pat. No. 3,947,307). In the device described therein, the fitting is provided with an annular flange or foot which underlies the foil surrounding the opening of the thin-walled container and is bonded thereto by ultrasonic energy between an ultrasonic head or sonotrode and an anvil which retains the rear wall of the foil container and forms a support for the foot of the fitting as the Sonotrode or ultrasonic head presses the overlying foil layer of the container against the flange of the fitting.

The injection-molded fitting, although preformed, is constituted of the same material as the synthetic-resin foil constituting the container, the annular head of the Sonotrode bearing along an annular zone surrounding the opening in the thin-wall container and against the flange underlying the same and unitary with the fitting. The anvil, as noted, supports the fitting through the opposite wall of the container. The annular foot or flange of the fitting has a thickness equal at least to ten times the wall thickness of the foil constituting the container and the anvil is specially shaped to provide the annular support which is required.

More particularly, as described in the aforementioned patent, the anvil comprises an upper member and a lower member forming the annular support surface for the weldng zone at the annular foot or flange of the fitting. The lower member is spaced from the upper member by a narrow gap and the upper member is centered with respect to the lower member by a wobbling or floating ball which is recessed in each of the two members. The purpose of the ball is to distribute the pressure applied during the ultrasonic welding action uniformly upon the flange of the fitting and the portion of the foil surrounding the opening of the container when the head is pressed toward the anvil. The intent thereby is to assure a uniform and fluid-tight welding at the interface of the flange of the fitting and the zone surrounding the opening of the foil container.

Although this device has been found to be highly effective, it has also been found to cause some problems.

Firstly, remote welding during the application of ultrasonic radiation and pressure cannot be prevented and such welding at locations other than those desired is a significant disadvantage. Moreover, there is a problem with bonding of the lower or rear foil wall of the container to the foot of the tubular fitting or spigot.

It has also been found that the ultrasonic vibrations are not uniformly applied to the relatively thick foot of the fitting or spigot and that such radiation frequently detrimentally affects the foil wall opposite the spigot notwithstanding efforts to limit the ultrasonic effects to the welding interface.

In practice it is found that the system can be operated only with relatively low ultrasonic energy if some of the other disadvantages enumerated above are to be avoided or limited.

Even the arrangement of the upper part of the anvil via the ball of the lower part of the anvil has a disadvantage because the ball does not always allow complete self-leveling and pressure equalization as rapidly as is desired, particularly when the welding process is held short. Such compensation is required since the foil thicknesses between the head or Sonotrode and the anvil frequently vary within fairly wide tolerances. The welding process is thus terminated before the ball system has had an opportunity to fully compensate for variations in the foil thickness and as a result a reduced weld quality is obtained and leakage may occur.

The latter disadvantage can only be limited at low ultrasonic energies with low applied pressures and corresponding long welding times are used. Since the welding time is increased to compensate for the aforementioned drawback, high energy consumption over long periods, is the undesired result.

OBJECT OF THE INVENTION

It is the principal object of the present invention to provide a device for the ultrasonic welding of a fitting or spigot in a thin-walled fluid vessel whereby the disadvantages of the aforedescribed conventional system can be eliminated and a highly efficient and economical, reproducible and total welding of the foil to the flange of the fitting or spigot can be effected.

SUMMARY OF THE INVENTION

This object and other which will become apparent hereinafter are attained, in accordance with the present invention, by the use of an anvil which is subdivided into an upper and a lower part, the upper part being provided essentially, i. e. along the axis of the ultrasonic welding head or Sonotrode, with an insert member forming a boss which holds the remote wall of the vessel above the surface of the upper member of the anvil facing the welding head or Sonotrode. This insert member can be received within a central recess formed in this surface.

According to another essential feature of the invention, the surface is formed with an annular recess in which an elastic rubber ring is embedded in axial registry with the foot of the annular flange of the fitting or spigot and hence in annular registry with the effective annular surface of the welding head or Sonotrode.

Still another important feature of the invention resides in connecting the upper and lower members of the anvil with mating male and female formations axially aligned with the aforementioned insert member and the welding head or Sonotrode, the male and female formations being respectively provided in the two members and constituting a projecting portion in one of the members which is received in a recess or socket of the other member. Advantageously, the two members confront one another along the horizontal plane perpendicular to the aforementioned axis and along which the male formation or projection is formed as a cylindrical boss in the lower member of the anvil. This boss is received in a downwardly open recess or socket formed in the confronting surface of the upper anvil member. The upper and lower anvil members are separated by a gap which is maintained by a further elastic rubber ring which is recessed in the aforementioned surface of the lower anvil member, spacedly surrounding the boss, and upon which the upper anvil member freely rests. This second rubber ring projects above the surface of the lower anvil member and is compressible with the welding head or Sonotrode is applied under pressure during the welding operation.

The elasticity of the first rubber ring, i.e. the rubber ring recessed flush with the surface of the upper anvil member confronting the Sonotrode is greater than the elasticity of the synthetic-resin foil to which the flange of the fitting is to be ultrasonically welded, while the elasticity of the second rubber ring, i.e. the rubber ring recesses in the surface of the lower annular member is less than that of the upper ring but nevertheless greater than the elasticity of the synthetic-resin foil.

It has been found to be important and advantageous that the lower or second rubber ring project above the aforementioned surface of the lower anvil member by about 2 mm to produce a uniform-width gap between the tow members of a corresponding dimension.

Surprisingly, experience has shown that the avil construction described above, when used with a welding head or Sonotrode of the usual type, namely, the type described in the aforementioned publication, precludes any welding or adhesion of the far wall of the foil container to the foot of the relatively thick injection-molded synthetic-resin fitting to be bonded in the opening of the other wall of this container. It is also surprising that the system of the present invention can permit a sharp increase in the applied welding pressure from the usual level of 0.2 atmosphere gauge to a level of about 1 atmosphere gauge. Still another advantage of the invention, based upon the use of augmented pressure, is the greater speed with which the ultrasonic can be carried out without any buckling of the foil and without an floating weld pattern, two disadvantages which has characterized the earlier system. The complete working cycle is thereby substantially shortened while reproducible, completely uniform and excellent weld joints are obtained.

It should be noted also that these advantages coincide with an improved ability to conduct excess welding energy away from the weld zone so that stray fields are excluded and the disadvantages thereof eliminated. Finally, the increased pressure also permits a more effective compensation for differences and unevennesses in the thickness of the foil, a particularly significant advantage resulting from the manner in which the upper anvil member is elastically supported on the lower anvil member.

The first rubber ring in the upper anvil member functions as an oscillation damper which restricts transmission of the ultrasonic energy to the foil of the rear wall of the vessel or dissipates the energy reaching this foil wall so that the latter does not tend to weld to the foot of the fitting of spigot even though it is in contact therewith at the increased welding pressure. The rubber ring is thus effectively more transparent to the ultrasonic energy than the foil so that the ultrasonic energy which might otherwise bring about undesired welding of the rear foil wall to the foot of the fitting is conducted away into the upper anvil member.

The rubber bridging the upper and lower anvil members is effective as a pressure damper to compensate for unevennesses and thickness in the foil as noted above.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
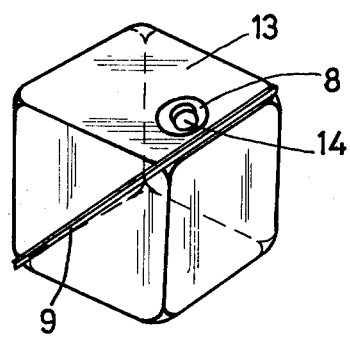
FIG. 1 is a perspective view of a container provided with a fitting or spigot according to the invention.
Figure 2:
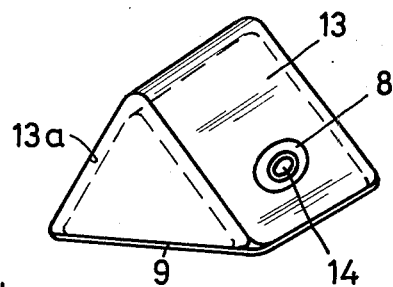
FIG. 2 is a view of this container in an inverted state, also in perspective.
Figure 3:
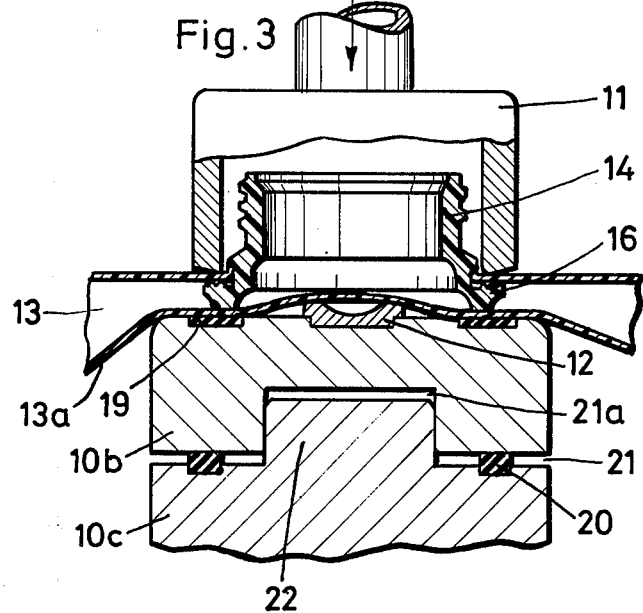
FIG. 3 is an axial cross-section through an ultrasonic welding device accordng to the invention.
Figure 4:
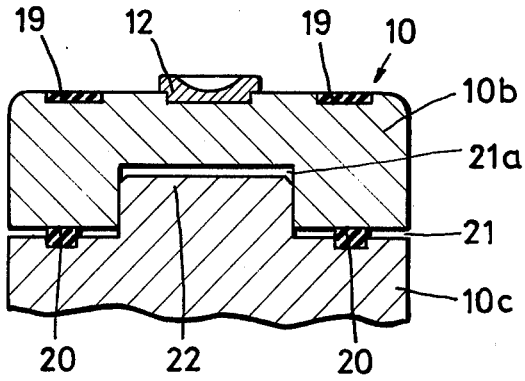
FIG. 4 is an axial section of the anvil of this device.

The container 13 (FIGS. 1 and 2) can be formed of synthetic-resion foil (high-pressure polyethylene) by blow-molding or vacuum-forming and comprises a diagonal inversion seam 9 which defines the base of the container in its position illustrated in FIG. 2 and which may lie against a corresponding wall of another container when two such triangular prismatic containers are stacked as shown in FIG. 1 to minimize the space occupied thereby. The containers are usually transported in a full state as shown in FIG. 1 for use by the consumer and emptying. Two such containers can be received in a single carton or each container may be provided in its own carton as required. The containers may be transported to the filling station in similar configuration. FIG. 2 hows at 13a, the inverted container. The containers 13 are formed during blow-molding or vacuum-forming with an opening aid in which the tubular fitting 14 is welded. The fitting 14 may be closed by a cap threaded onto the fitting or connected thereto by a bayonet coupling as desired.

The welding of the fitting 14 to the container is effected with the inverted container (FIG. 2) such that the foil walls 13a which is also sandwiched between the welding head of Sonotrode 11 and the anvil is not bonded to the foot of the fitting 14.

The ultrasonic welding head of Sonotrode 11 is a pot-shaped (downwardly concave) cylindrical member which is juxtaposed with the steel anvil 10 having the special configuration of the present invention.

The anvil 10 comprises an upper member 10b serving as an oscillation damper and a lower member 10c serving as a pressure damper. To this end, the upper member 10b is provided centrally (along the axis of the head 11) with an insert body or boss 12 received in a central recess in a flat surface of the member 10b against which the wall 13a of the container can lie except in those regions in which it is lifted from the wall by the boss 12.

The boss 12 thus prevents the synthetic-resin foil wall 13a from lying flat against the upper surface of part 10b of the anvil.

The upper part 10b of the anvil is further provided in registry with the annular welding face of the Sonotrode 11 and the foot 16 of the annular flange of the injection-molded synthetic-resin fitting of spigot 14, with an annular recess in which a rubber ring 19 is received and bonded so that its upper surface lies flush with the upper surface of member 10b. The rubber ring 19 is composed of a material of greater elasticity than the synthetic-resin foil 13a.

During the ultrasonic welding process, i.e. when the Sonotrode 11 presses the foil surrounding the opening 8 against the foot 16 from the top, the elastic ring 19 conducts excess energy into the upper member 10b without welding or adhesion of the synthetic-resin foil wall 13a to the foot 16 of the fitting 14.

The lower part 10c of the anvil is provided with an annular recess in its upper surface parallel to and confronting the upper surface of the upper member 10b and preferably in registry with the rubber ring 19. A further rubber ring 20 is received in the latter recess and projects above the surface of the lower member 10c by a distance of about 2 mm. The elasticity of the ring 20 is less than that of ring 19 but greater than that of the foil. As a result, the rubber ring 20 defines the width of the gap 21 between the upper and lower members of the anvil.

The lower member 10c is provided with a central boss 22 of cylindrical configuration in axial alignment with the Sonotrode 11. The boss 22 is received within a complementary cylindrical recess formed in the lower face of the upper member 10b and defines a gap 21a with the upper member in this recess. The gap 21a also has a width of about 2 mm.

The device operates with the advantages above and, as compared with the conventional device, provides improved weld joints at much higher operation speed.

We claim:

1. A device for the ultrasonic welding of a tubular fitting having an annular flange in an opening of a thin-wall synthetic resin foil container which comprises:
    an axially displaceable ultrasonic welding head having an annular face alignable with said flange for ultrasonically welding the foil of said container around said opening receiving said fitting; and
    an anvil supporting another wall of said container against said fitting and supporting said fitting against said ultrasonic welding head, said anvil, comprising an upper anvil member and a lower anvil member, said upper anvil member having an upper surface confronting said head and formed in axial alignment with said head with a protuberance holding said other wall away from said surface, said surface being provided with an annular groove receiving a first rubber ring registering with said annular face of said head and supporting said flange of said fitting, said lower member having a surface juxtaposed with said upper member and provided with an annular recess receiving a second rubber ring, said second rubber ring projecting above the surface of said lower member, said lower member and said upper member being provided with mating cylindrical formations for preventing tilting of the upper member relative to the lower member, said second rubber ring maintaining a gap between said members, the elasticity of said first rubber ring being greater than the elasticity of the foil forming said container, the elasticity of said second rubber ring being greater than that of the foil constituting said container but less than that of said first rubber ring.

2. The device defined in claim 1 wherein said second rubber ring projects about 2 mm above said surface of said lower member.

3. The device defined in claim 2 wherein said first rubber ring is flush with said surface of said upper member.

4. The defice defined in claim 3 wherein said protuberance is an insert member received in said upper member.

5. The device defined in claim 4 wherein said lower member is formed with a male formation and said upper member is formed with a female formation receiving said male formation.

* * * * *